April 2, 1957
J. SEGUI
2,787,357
MECHANISM FOR WINDING PAPER TAPES IN SHORTHAND
TYPEWRITERS, CALCULATING AND OTHER MACHINES
Filed Dec. 16, 1953
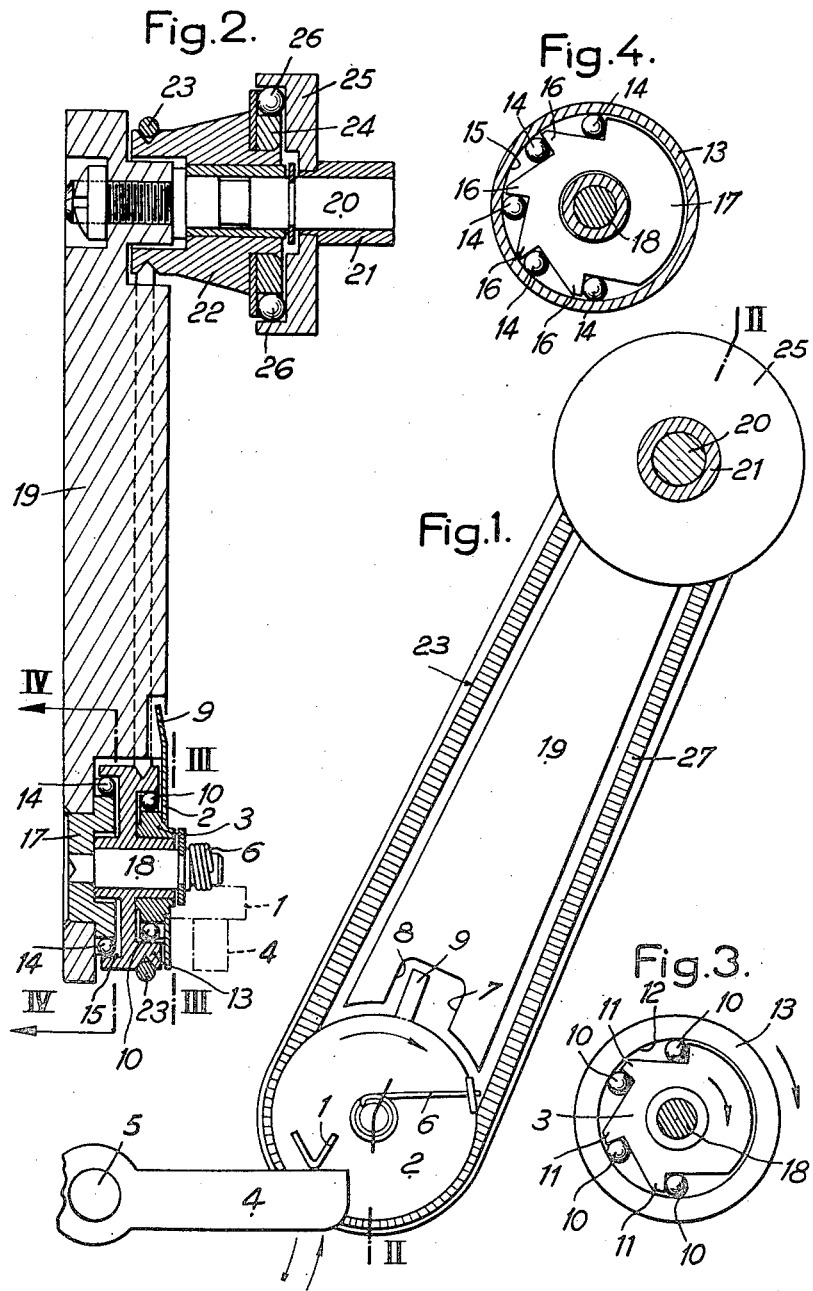
INVENTOR
JEAN SEGUI
Ostrolenk & Faber
ATTORNEYS

United States Patent Office 2,787,357
Patented Apr. 2, 1957

2,787,357

MECHANISM FOR WINDING PAPER TAPES IN SHORTHAND TYPEWRITERS, CALCULATING AND OTHER MACHINES

Jean Segui, Vincennes, France, assignor to Societe Anonyme dite: Stenotype Grandjean, Paris, France Application December 16, 1953, Serial No. 398,605

Claims priority, application France July 21, 1953

2 Claims. (Cl. 197—133)

This invention relates to mechanisms of the type used in shorthand typewriters, calculating and other machines for winding up the paper tape on a spool as it is printed or otherwise processed and also to properly tension the paper tape between the aforesaid spool and the impression roller while avoiding any paper flapping and a noisy operation.

In the devices used in known constructions, pawl-and-ratchet systems have been widely used, but their operation is rather noisy.

The mechanism provided by this invention does not include any pawl and ratchet system and is characterized by a first wheel adapted, upon each striking of a key or actuation of the machine, to be positively driven for rotation about its axis through a certain angle in one direction by the universal bar or any other suitable member, and to be moved in the opposite direction by a return spring adapted constantly to urge a projection on said wheel against an arm rigid with said universal bar, a grooved pulley coaxial with and driven by this first wheel through a free-wheel device, and a stationary coaxial disc connected through another free-wheel device to this grooved pulley to permit the positive drive of the grooved pulley from the universal bar in the desired direction and to positively prevent the rotation of said grooved pulley in the other direction, in combination with an endless belt having a certain resiliency and consisting for example of a steel-wire coil spring located in the groove of the pulley and in the groove formed in an intermediate member adapted freely to rotate about the axis of the spool-carrying hub to be driven, a free-wheel device being also interposed between said intermediate member and a coaxial disc rotatably fast with said hub, so that the intermediate member will positively drive this hub in the tape-winding direction and that the hub may rotate freely in the same direction.

The aforesaid free-wheel devices may consist of one-way clutches depending on the wedging action of balls.

The accompanying drawing forming part of this specification illustrates diagrammatically by way of example one form of embodiment of the invention. In the drawing:

Fig. 1 is a side view of the mechanism.

Fig. 2 is a sectional view of the mechanism taken upon the line II—II of Fig. 1.

Figs. 3 and 4 are sectional views taken upon the lines III—III (the cover plate being removed) and IV—IV of Fig. 2.

A lateral projection 1 rotatably fast with a disc 2 also rotatably fast with a toothed wheel 3 is constantly urged by a spring 6 against the free end of an arm 4 rigid with the universal bar 5 of the machine which is oscillated to and fro about its axis during the operation of the machine; two stops 7, 8 cooperating with a peripheral projection 9 of disc 2 are provided for limiting the amplitude of oscillation of this disc, notably its return movement under the influence of spring 6 when the projection 1 escapes from the end of the arm 4.

A set of balls 10 are placed between the teeth 11 of the toothed wheel 3 and the inner surface 12 of a grooved pulley 13.

Another set of balls 14 are placed between the inner surface 15 of the grooved pulley 13 and the teeth 16 of a toothed member 17 keyed or otherwise secured on an arm 19 adapted to carry the paper spool as will be made clear presently. The grooved pulley 13, toothed wheel 3 and disc 2 are coaxial with the toothed member 17 and mounted on a common shaft 18 rigid with this toothed member 17.

On the end of arm 19 which is remote from that carrying the shaft 18 there is secured another shaft 20 carrying the hub 21 of the spool on which the paper tape is to be wound; this shaft 20 has mounted for free rotation thereon a grooved member 22 adapted to receive a steel-wire coil spring 23 which is also located in the groove of pulley 13.

Between a toothed wheel 24 rotatably fast with the grooved member 22 and a ring member 25 rotatably fast with the hub 21 are disposed a plurality of balls 26 adapted through their wedging action positively to drive this ring member 25 and the hub 21 for rotation therewith in the desired direction while permitting its free rotation in the reverse direction.

It will be readily understood that with this device the universal bar 4 will drive step by step and very smoothly the grooved pulley 13, the inner reach 27 of the steel-wire coil spring 23 will be constantly tensioned so as to frictionally drive the member 22 driving in turn the hub 21 and the spool (not shown) fixedly carried thereby, the paper tape winding up on said spool under a constant tension.

It will be understood that the embodiment of the invention described hereinabove with reference to the attached drawing is merely illustrative of the manner in which the invention may be carried out in practice, whilst many desired modifications may be brought thereto without departing from the spirit and scope of the invention.

What I claim is:

1. A control mechanism for machines such as shorthand typewriters, calculating and other machines of this type, intended to enable the paper tape to be wound on a spool carried by a hub driven positively for rotation from the universal bar of the machine in the paper-winding direction whilst permitting the free rotation of said spool and hub in the same direction, comprising a first wheel, a lateral projection on said wheel, a rocking arm fast with said universal bar and adapted to engage through its free end said lateral projection on said first wheel for rotating the latter in the paper-winding direction, a spring constantly urging said first wheel for rotation in the opposite direction so as to cause said projection to engage said arm, a grooved pulley coaxial with said first wheel, a free-wheel device interposed between said first wheel and said pulley for positively driving said pulley from said wheel in the paper-winding direction only, a stationary coaxial plate, another free-wheel device between said pulley and said plate for permitting positive driving of said pulley from said universal bar in the paper-winding direction only and preventing said pulley from rotating in the reverse direction, a hub for the paper spool to be wound, the axis of said hub being parallel with, and positioned at a certain interval from, that of said pulley, an intermediate member adapted to rotate around said hub and provided with a circular groove co-planar with the groove of said pulley, a resilient endless belt engaging, and tensioned between, said grooves for rotatably driving said intermediate member from said grooved pulley, a disc coaxial and rotatably fast with said hub, and a freewheel device interposed between said intermediate member and said disc for positively driving said disc and spool-carrying hub from said intermediate member in the paper winding direction while permitting the free rotation of said hub in the same direction.

2. A mechanism according to claim 1 wherein said freewheel devices consist of one-way clutches depending on the wedging action of balls.

References Cited in the file of this patent

UNITED STATES PATENTS

| | | |
|---|---|---|
| 1,068,325 | Cooper | July 22, 1913 |
| 1,169,318 | Cooper | Jan. 25, 1916 |
| 2,510,626 | Geisheck | June 6, 1950 |